(12) United States Patent
Burnett et al.

(10) Patent No.: US 12,511,373 B2
(45) Date of Patent: Dec. 30, 2025

(54) PROCESSING TRANSACTIONS INVOLVING CARD READER DEVICES CONTAINERIZED EXECUTION OF CODE

(71) Applicant: STRIPE, INC., South San Francisco, CA (US)

(72) Inventors: Karla Burnett, Bondi Junction (AU); Andrew Reitz, San Francisco, CA (US); Yasha Mostofi-Ashtiani, Naperville, IL (US); Jason Shantz, Surrey (CA); Justin Sippel, Portland, OR (US); Andrew Dunham, San Francisco, CA (US); Shawn Moore, Revere, MA (US); Adam Zev Sorkin, Davis, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 18/501,756

(22) Filed: Nov. 3, 2023

(65) Prior Publication Data
US 2024/0061927 A1   Feb. 22, 2024

Related U.S. Application Data

(63) Continuation of application No. 17/084,454, filed on Oct. 29, 2020, now Pat. No. 11,822,642.

(51) Int. Cl.
*G06F 21/53*   (2013.01)
*G06F 8/30*    (2018.01)
*G06F 21/56*   (2013.01)

(52) U.S. Cl.
CPC .............. *G06F 21/53* (2013.01); *G06F 8/30* (2013.01); *G06F 21/56* (2013.01); *G06F 2221/2141* (2013.01)

(58) Field of Classification Search
CPC . G06F 21/53; G06F 8/30; G06F 21/56; G06F 2221/2141
USPC .......................................................... 726/22
See application file for complete search history.

(56) References Cited

U.S. PATENT DOCUMENTS

| | | | | |
|---|---|---|---|---|
| 8,438,303 | B2* | 5/2013 | Colvig | H04L 69/14 370/225 |
| 9,667,610 | B2* | 5/2017 | Theebaprakasam | H04L 63/102 |
| 10,375,111 | B2* | 8/2019 | Schultz | G06F 21/53 |
| 10,776,322 | B2 | 9/2020 | Danilov et al. | |
| 10,877,739 | B1* | 12/2020 | Fernandez | G06F 9/455 |
| 2015/0235041 | A1* | 8/2015 | Court | H04L 63/102 726/26 |
| 2015/0365412 | A1* | 12/2015 | Innes | H04L 63/12 726/7 |
| 2015/0378709 | A1 | 12/2015 | D'Amico et al. | |
| 2017/0054724 | A1* | 2/2017 | Maple | H04L 63/08 |
| 2018/0300499 | A1* | 10/2018 | Agarwal | H04L 63/0428 |
| 2019/0334918 | A1 | 10/2019 | Abiezzi et al. | |
| 2019/0347339 | A1* | 11/2019 | Becker | G06F 11/3476 |
| 2020/0387627 | A1* | 12/2020 | Kfir | G06F 21/6245 |

(Continued)

*Primary Examiner* — Lynn D Feild
*Assistant Examiner* — Saad Ahmad Abdullah
(74) *Attorney, Agent, or Firm* — BAKERHOSTETLER

(57) ABSTRACT

A method and apparatus for executing code in a container are described. In one embodiment, the method comprises generating code on a host computer system using a user interface; and executing the code inside a container on the host computer system, including performing access control based on one or more properties of the host computer system.

20 Claims, 6 Drawing Sheets

(56) References Cited

U.S. PATENT DOCUMENTS

2021/0056225 A1\* 2/2021 Sislow ................ G06F 21/6227
2021/0084048 A1\* 3/2021 Kannan ................ H04L 63/104
2023/0038228 A1\* 2/2023 Chen ....................... H04L 67/56

\* cited by examiner

PROCESSING TRANSACTIONS INVOLVING CARD READER DEVICES CONTAINERIZED EXECUTION OF CODE

PRIORITY CLAIM

The present application is a continuation of U.S. patent application Ser. No. 17/084,454, filed Oct. 29, 2020, entitled "PROCESSING TRANSACTIONS INVOLVING CARD READER DEVICES CONTAINERIZED EXECUTION OF CODE", of which is incorporated by reference in its entirety.

FIELD OF THE INVENTION

Embodiments of the present invention relate to the field of systems for processing commercial transactions; more particularly, embodiments of the present invention relate to executing code (e.g., untrusted code, arbitrary code, etc.) in a container with access control and auditing.

BACKGROUND OF THE INVENTION

Software development usually involves a number of steps including determining requirements, drafting specifications, designing a software architecture, coding, testing, debugging, and deploying or otherwise releasing the software.

As part of the software development process, individuals may be able to unilaterally execute untrusted code in production. This can pose a substantial risk to a company even when used in the case of an emergency. This is due to the fact that in some instances a company needs to be able to state to its auditors that if an employee, or their computer system, performed malicious actions in the production environment, the company would be able to know what kind of damage has been done. Thus, there is a need to be able to allow continued execution of code by an employee in a production environment while ensuring that the company of the employee is able to know what actions the code took or caused.

SUMMARY

A method and apparatus for executing code in a container are described. In one embodiment, the method comprises generating code on a host computer system using a user interface; and executing the code inside a container on the host computer system, including performing access control based on one or more properties of the host computer system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
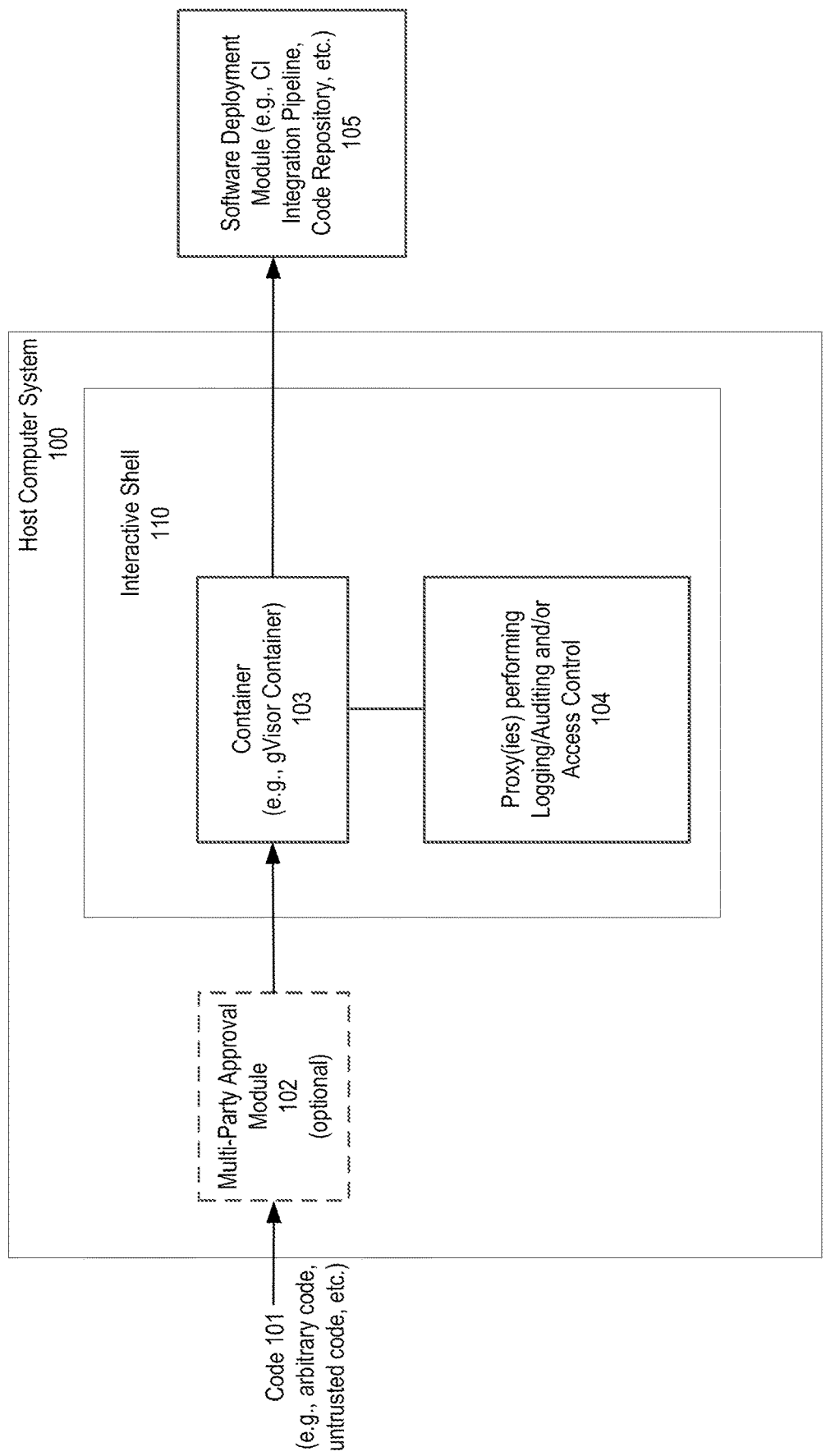
FIG. 1 illustrates one embodiment a host computer system for executing software code.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Techniques are disclosed herein for executing software code. In one embodiment, the code is untrusted or arbitrary code. In one embodiment, code is executed in a container in a production environment. In one embodiment, the container runs on a host computer system (host) operating in or as part of the production environment. In one embodiment, the container executes untrusted/arbitrary commands inside a production shell using a virtually "air gapped" container (e.g., gVisor container) in which all network traffic into and out of the container is run through a series of proxies on the host. That is, network traffic (e.g., network calls, network requests, etc.) that is generated as a result of, or in response to, executing the code in the container is run through one or more proxies. In one embodiment, the network traffic is the only items that flow out of the container during execution. In one embodiment, the network traffic includes network communications into and out of the container. In this case, the container acts as a security boundary as it has no network privileges (e.g., it has no network stack).

In one embodiment, the proxies perform auditing for the traffic into or out of the container. In such a case, the proxies log the traffic into and out of the container. Also, in one embodiment, the container prevents a user from accessing audit logs associated with execution of the commands in the container while controlling access to resources.

In one embodiment, the proxies listen to and enforce access controls with respect to resources. In one embodiment, the proxies perform access control with respect to the network traffic out of the container. In such a case, the proxies receive requests for access to one or more resources (e.g., databases, data collections, services, network locations, etc.) and determine whether the requests for access are allowed to be completed. If a proxy determines that access is permitted, each request is allowed to proceed to the resource for which access is requested; if the proxy determines that access is not permitted, the request is prevented from proceeding to the resource for which access is requested.

In one embodiment, the proxies perform access control on a per user basis. In this case, the proxies determine whether a user that is executing the code in the container has permission to access a particular resource and, based on that determination, grants or denies access. In one embodiment, these controls are based on the individual to whom the container is assigned. For example, a proxy may allow an employee executing code in a production environment to access a database or sensitive collection (e.g., API keys collections, user passwords or other personal identification information, etc.) of a commerce platform or a computer system owned or controlled by the team of which he/she is part but not another employee on a different team or tenant.

In one embodiment, the production environment provides multi-party approval of the code prior to execution in the container. In one embodiment, the multiple parties include the individual executing the code and at least one other individual. Note that these individuals may be part of the same team or group in a company. Upon approval by all parties, the code enters and is executed in the container.

Thus, in one embodiment, the techniques disclosed herein allow code to be run in a way that provides strong audit controls, provides for multi-party approval and enables limits to be implemented to control the actions that individuals are allowed to perform, particularly when access to resources (e.g., databases, sensitive collections, internal and external services, S3 or other similar buckets, etc.) is performed by the code.

In one embodiment, the code is associated with a commerce platform that has one or more servers to process commerce transactions, including one or more servers to process payments on behalf of merchants in the commerce platform. The techniques disclosed herein are not limited to use with code associated with commerce platforms, and may be used for other types of code.

FIG. 1 illustrates one embodiment a host computer system for executing software code. Referring to FIG. 1, host computer system 100 includes an interactive shell environment 110. In one embodiment, interactive shell environment 110 is a REPL environment. In an alternative embodiment, the interactive shell environment is one in which an individual that is executing code in the interactive shell environment is not allowed or otherwise able to access audit logs and trails regarding operations that have been executed in the interactive shell environment.

Code 101 is provided to the interactive shell environment 110. In one embodiment, code 101 is arbitrary code or untrusted code. In one embodiment, code 101 is provided to interactive shell environment 110 via another computer system (e.g., a programmer's computer system). In one embodiment, code 101 is entered into interactive shell environment 110 via a graphical user interface. In one embodiment, the interface is a graphical user interface displayed on a screen of a computer system providing code 101 but served from host computer system 100.

In one embodiment, prior to executing interactive shell environment 110, code 101 is input into a multi-party approval module 102. In one embodiment, multi-party approval module 102 is optional to employ. Multi-party approval module 102 causes the code to undergo a multi-party approval process prior to entering the interactive shell environment 110. In one embodiment, the multi-party approval process involves having code 101 approved for execution in interactive shell environment by multiple individuals. In one embodiment, the multiple individuals include the provider of code 101 and at least one other individual. In one embodiment, the approving parties are individuals with permissions or credentials that allow them access to one or more databases, sensitive collections of data that are to be accessed or acted upon by code 101, and/or services to be used during execution in interactive shell environment 110. In one embodiment, the multi-party approval process involves two individuals, the provider of code 101 and another team member with the same or higher access/permission credentials, and code 101 is only executed after receiving approval from both individuals.

Upon approval, code 101 is provided to and executed in a container 103 in interactive shell environment 110. In one embodiment, the commands are executed in a container that is inside a production shell session. In one embodiment, container 103 comprises a gVisor container. Note that container 103 is not limited to being a gVisor container and may be implemented with other types of containers (e.g., Firecracker containers, etc.). In one embodiment, the container has a number of characteristics including the limiting of system calls being issued in user space (as opposed to kernel space) and preventing access to logs to prevent a user from compromising an audit trail that is generated as a result of executing the code.

In one embodiment, as code 101 is executed in container 103, the network traffic into and out of container 103 runs through one or more proxies. The network traffic may comprise network calls or requests (e.g., HTTP requests, requests to databases) and/or their responses. The network requests may include requests to access resources, such as, for example, but not limited to, databases, sensitive data collections, internal services, remotely located systems, host computer systems, sensitive credentials, etc. In one embodiment, the proxies run on host computer system 100. However, in alternative embodiments, one or more of the proxies 104 may be executing on another computer system (e.g., server, cloud-based computer, etc.), which may be remotely located with respect to the host computer system 100.

In one embodiment, proxies 104 also perform access control with respect to resources (e.g., databases, sensitive data collections, services, remotely located systems, host computer system, etc.). In one embodiment, the access control is performed on a per user basis. In other words, the proxies 104 perform access control that intercepts communications generated by code 101 for accessing a particular resource (e.g., a database, a sensitive collection, a service, etc.) and determines whether the individual executing code 101 in container 103 is able to access that resource or host. In one embodiment, the access control determination is made by determining if the individual executing code 101 (or their computer system) has permission to access that resource. In one embodiment, the individual may have permission based on their status as a team member that has been previously provided access to that resource.

In one embodiment, proxies 104 perform logging and auditing of any traffic into and out of container 103. That is, proxies 104 perform auditing of any network communications made into or out of the container using one or more proxies running on a host. As part of the logging/auditing, in one embodiment, proxies 104 store records of the actions performed by the code as well as the commands entered by the user, including network traffic into and out of container 103. In one embodiment, the records are stored in databases in a manner well-known in the art. In one embodiment, the auditing logs provide an audit trail for actions performed by the unapproved code, specifying each action taken, which user performed each action, which other users (if any) provided multi-party access, and when each action occurred, including which requests were made, to which resource and containing what data.

The results of execution of code 101 may be displayed to the user via a graphical user interface.

In one embodiment, after execution in container 103, code 101 is available to be deployed, or otherwise output for use, using software deployment module 105. In one embodiment, software deployment module 105 may include a continuous integration pipeline and a code repository to enable deployment of code 101.

Figure 2A:
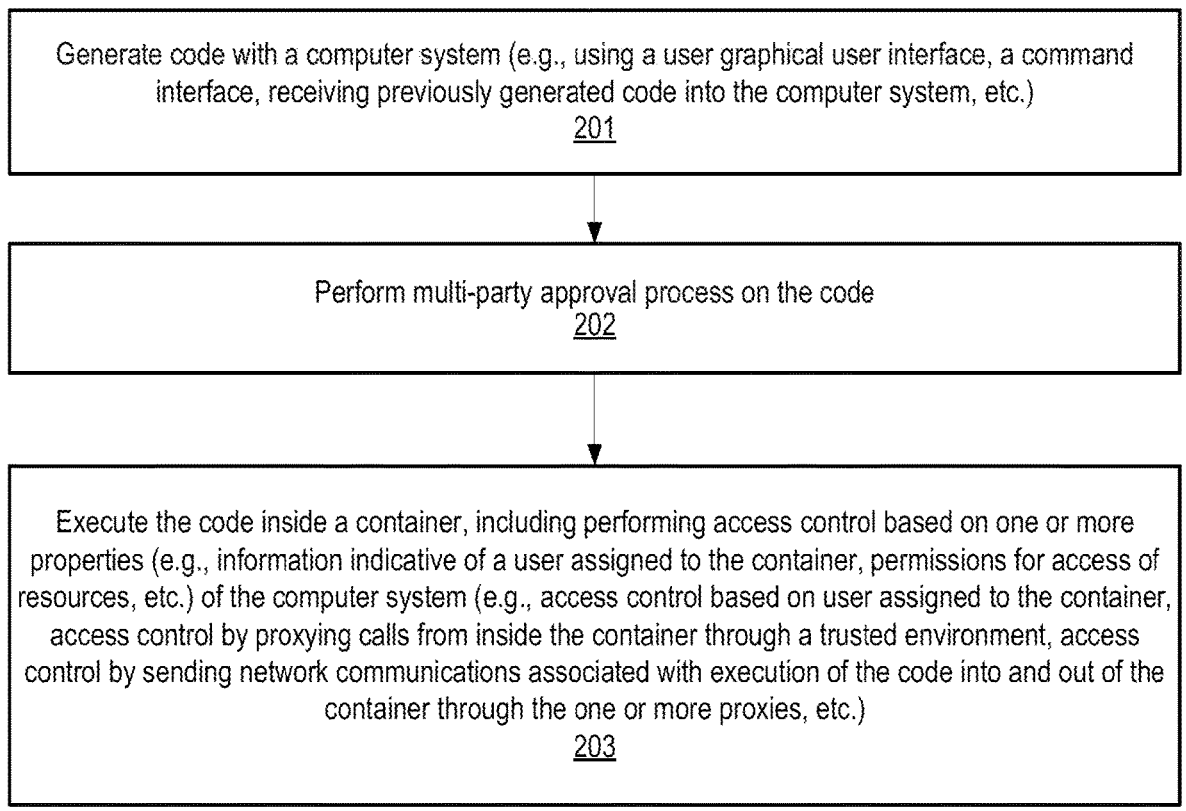
FIG. 2A is a flow diagram of one embodiment of process for deploying software code.

FIG. 2A is a flow diagram of one embodiment of process for deploying software code. The process is performed by processing logic that comprises hardware (e.g., circuitry, dedicated logic, etc.), software (e.g., software running on a chip, software run on a general-purpose computer system or a dedicated machine, etc.), firmware, or a combination of the three. In one embodiment, the process is performed by a host computer system such as, for example, host computer system 100 of FIG. 1.

Referring to FIG. 2A, process begins by generating code on a host computer system using a user interface (processing block 201). In one embodiment, the code is generated using a graphical user interface of a computer system via a user entering lines of code in the graphical user interface. In another embodiment, the code is provided to or by the same computer system upon which the code is executed during production.

In response to the code being generated, but prior to execution, in one embodiment, the code undergoes a multi-party approval process on the code (processing block 202). This is optional. In one embodiment, if such a process is used, the code is not executed until all the parties that are part of the multi-party approval process approve the code for execution.

Figure 2B:
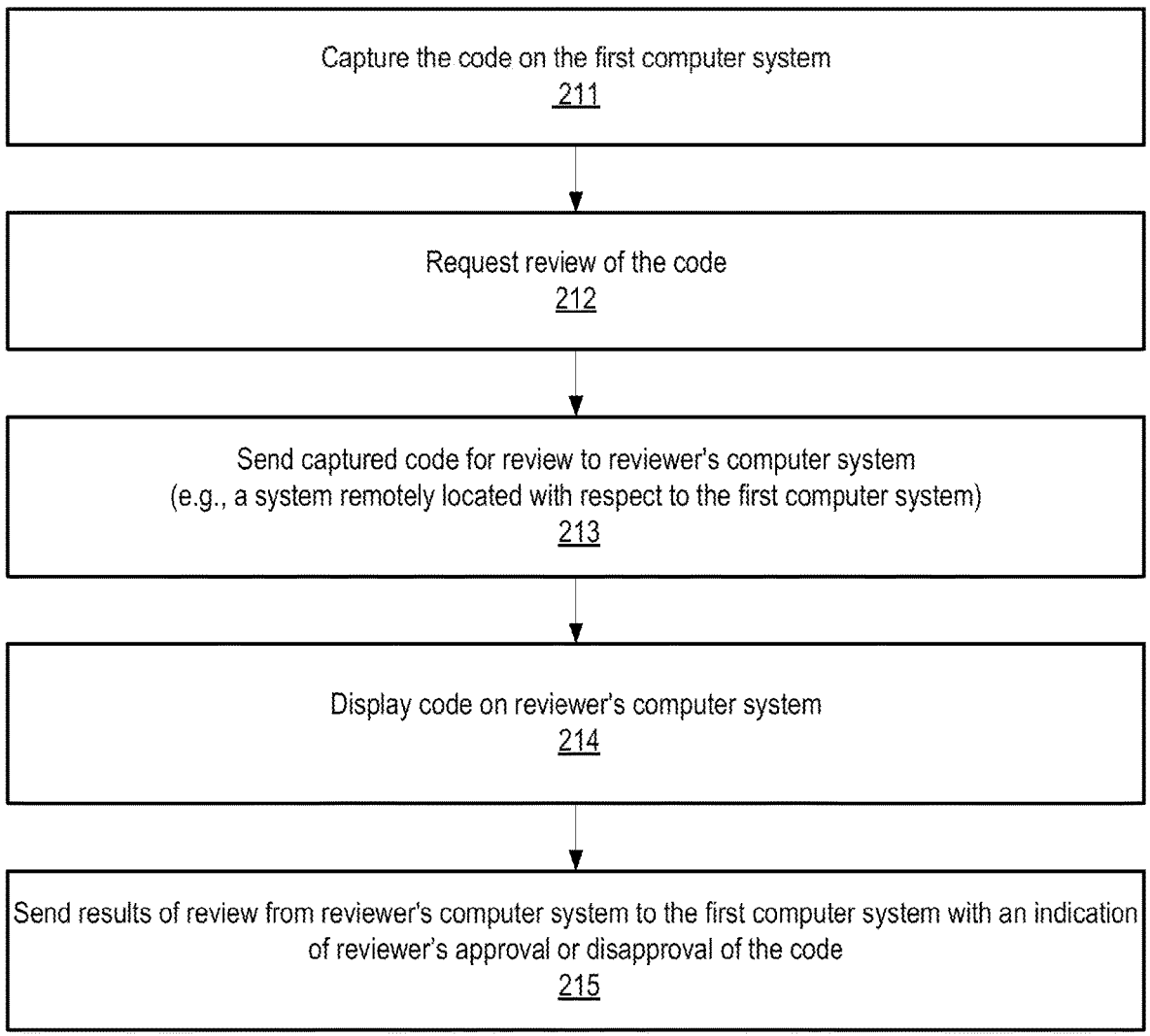
FIG. 2B illustrates one embodiment of a multi-party code review and approval process.

FIG. 2B illustrates one embodiment of a multi-party code review and approval process. The process is performed by processing logic that comprises hardware (e.g., circuitry, dedicated logic, etc.), software (e.g., software running on a chip, software run on a general-purpose computer system or a dedicated machine, etc.), firmware, or a combination of the three. Referring to FIG. 2B, the multi-party approval process begins by processing logic capturing the code on a first computer system (e.g., the host computer system) (processing block 211) and receiving a request for code review (processing block 212). In one embodiment, the user of the first computer system enters code on a graphical user interface (e.g., a web page interface) as part of a code entry session and requests its review. In one embodiment, the request for review is generated in response to an individual engaging in a user interface element on the GUI (e.g., the user selects a button or drop-down menu on the GUI). In response to receiving the request for review, processing logic sends the captured code for review from the first computer system to a reviewer's computer system (processing block 213). In one embodiment, the reviewer's computer system is remotely located with respect to the host computer system. Upon receipt of the code, processing logic on the reviewer's computer system displays the code for review (processing block 214) and receives an indication of approval or disapproval from the user of the reviewer's computer system as to whether the code is approved and disapproved for execution. In one embodiment, the approval process is based, at least in part, upon approving access to data in certain sensitive collections or databases.

The indication of approval or denial may be generated as a result of the user of the reviewer's computer system selecting a GUI element (e.g., an approve button, a disapprove button, etc.). In response to receiving the indication, processing logic sends the results from the reviewer's computer system to the host computer system with an indication of approval or disapproval of the code (processing block 215). In this manner, code that is executed in a container inside an interactive production shell may be access-controlled with commands permitted access to certain databases, sensitive data collections, etc. signed off by multiple parties.

Referring back to FIG. 2A, upon approval of the code, processing logic executes the code inside a container on the host computer system, including performing access control based on one or more properties of the host computer system (processing block 201). In one embodiment, the commands of the code are executed in a production session. In one embodiment, the production session is a production shell session.

In one embodiment, performing access control comprises running one or more proxies and sending network communications associated with execution of the code into and out of the container through the one or more proxies. In one embodiment, these proxies run on the host computer along with the container executing the code. In another embodiment, one or more of the proxies run on one or more other computer systems that are remotely located with respect to the computer system upon which the container executes the code.

In one embodiment, the access control is performed by proxying all the calls (e.g., requests) from inside the container through a trusted environment that performs the access control itself. In one embodiment, the trusted environment logs actions performed as part of executing the code to produce an audit trail, including the generation of audit logs. In one embodiment, the audit logs are for the network communications proxied through the trusted environment and/or the proxies that are contained therein.

In one embodiment, the access control is with respect to databases and/or data collections that are to be accessed as a result of executing the code. In one embodiment, the access control is enforced on a per user basis (e.g., access control is based on access permissions of the computer system generating or otherwise providing the code for execution).

In one embodiment, the one or more properties upon which access control is based comprises information that is indicative of a user assigned to the container such that access control is based on whether the user assigned to the container has permission for an access performed as a result of executing the code. For example, the execution of the code may cause a database request to be generated and sent. In this case, a proxy determines if the individual assigned to the container (e.g., the individual creating the code) has permissions to access the database. In one embodiment, the connection to the database is proxied and a check is made to the header in the request to determine the container from which the request came. Based on this information, a determination is made that the container is assigned to a particular user and the proxy determines whether to grant or deny the access based on whether the user has the requisite permission to access that database. In this manner, the proxies control the data that is fetched as a result of executing the code and enforce safety guarantees.

In one embodiment, executing the code and performing the access control associated with executing the code includes replacing, by one of the proxies, an instance credential in a network request originating inside the container (as the result of executing the code) with a user-specific credential. This will be described in more detail below.

Figure 3:
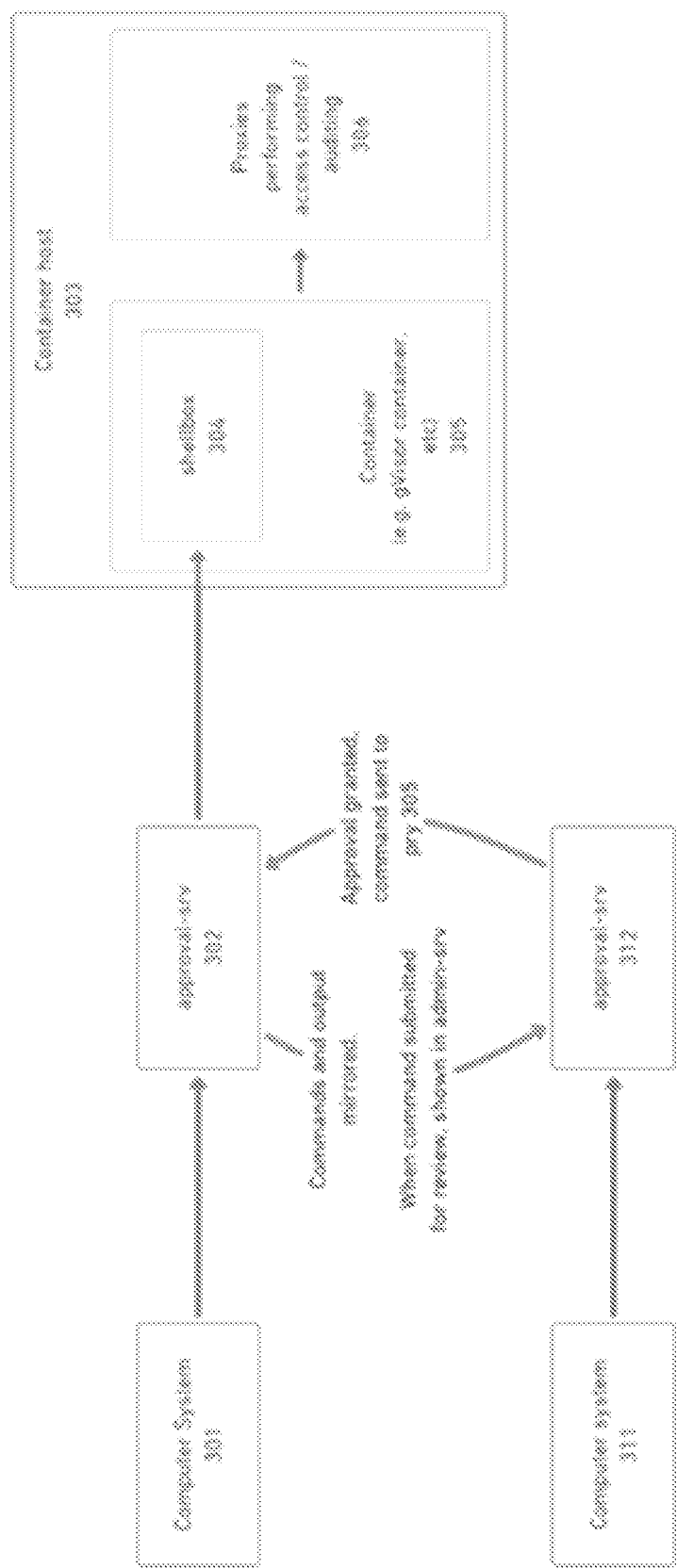
FIG. 3 illustrates one embodiment of a two-person sign-off infrastructure.

FIG. 3 illustrates one embodiment of a two-person sign-off infrastructure. Referring to FIG. 3, a user using computer system 301 enters code into a service, referred to herein as approval-srv 302. This service receives all commands entered by the user and outputs a copy of them to a service, approval-srv 312, computer system 311 of another user for review by that individual. In one embodiment, the commands and output that are mirrored are sent in response to the user of computer system 301 hitting an enter button and/or a request for approval button.

In one embodiment, prior to the commands and output being sent to the reviewer, a request to review the code is sent to the computer systems of one or more individuals. In one embodiment, one of these individuals of one of the computer systems can decide to be the reviewer. In such a case, the user clicks on a link or engages in another GUI element indicating they want to be the reviewer and this causes the link to be invalidated for all of the other individuals. This results in the container being mapped to these two individuals, the code author and the person that is the reviewer, for audit purposes. Thus, all commands executed in the container are written and approved by the same pair of people, and these two individuals are associated with the container and are included in any audit log/trail that is generated as a result of the execution of the code (e.g., the container's audit log is mapped to both the author and reviewer/approver).

In response to the request for approval, approval-srv 312 presents the reviewer at computer system 311 with the request. At this point, the reviewer at computer system 311 can review the commands that the user of computer system 301 wants to execute and can approve or deny those commands. In one embodiment, approval or denial is performed by the reviewer selecting one or more links or other GUI element on the display.

Approval or denial 301 is sent from approval-srv 312 to approval-srv 302. In response to a denial, the code is not forwarded to container host 303 to begin execution by container 305 (e.g., a gVisor container, etc.) in an interactive shell environment (e.g., an interactive shell). If approved, the code is forwarded from approval-srv 302 to container host 303 where it is executed in container 305 that runs an interactive shell in shellbox 304. In one embodiment, the code is forwarded automatically. In another embodiment, the code is only forwarded after the user that generated the code receives the approval and approves the code to be forward to container 305 for execution. During execution, any calls or network requests that are part of the code executing in container 305 are proxied by proxies 306 performing access control and/or auditing.

Figure 4:
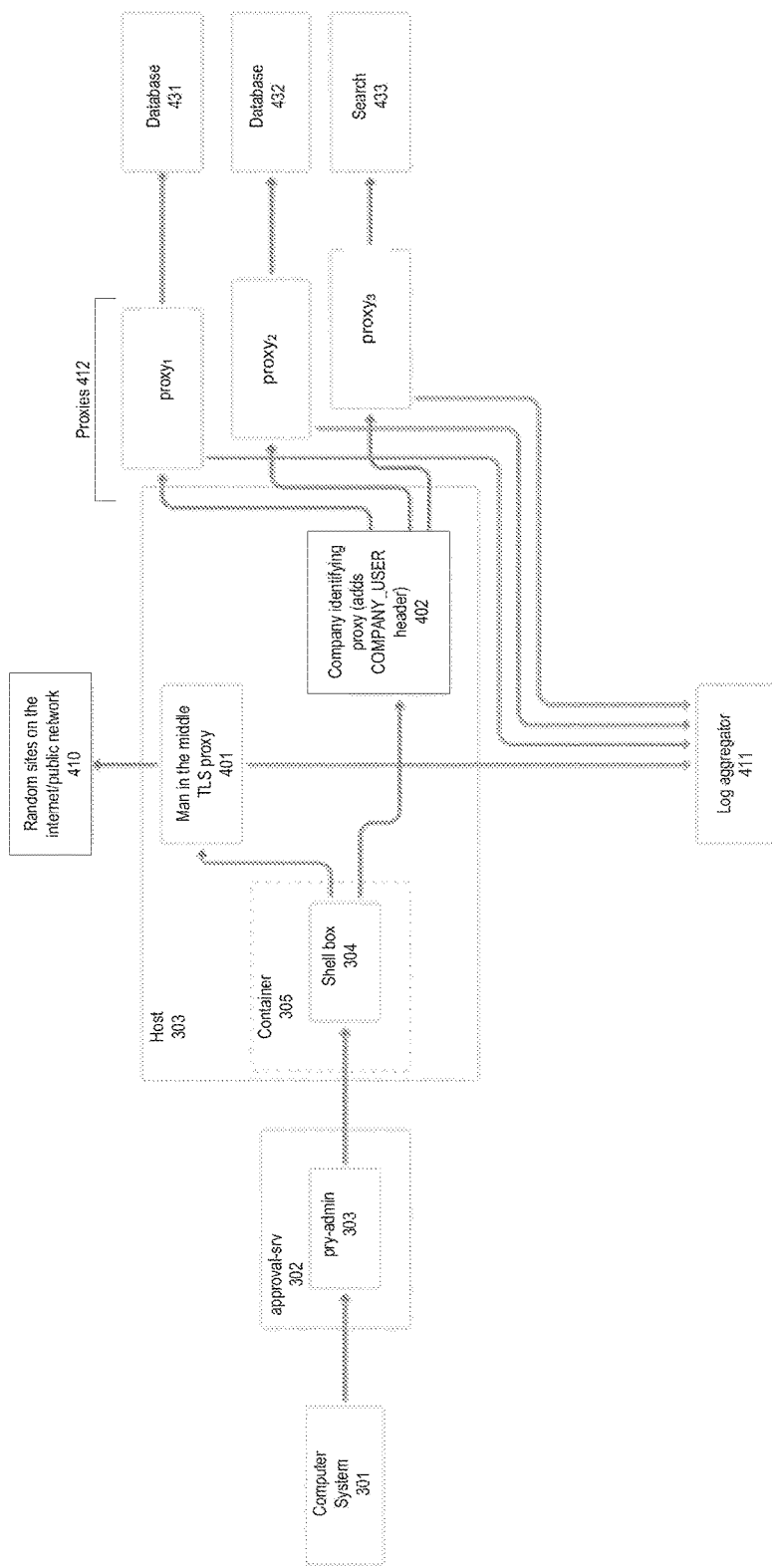
FIG. 4 illustrates a more detailed depiction of one embodiment of the proxying arrangement used to proxy calls resulting from execution of code by a container.

FIG. 4 illustrates a more detailed depiction of one embodiment of the proxying arrangement used to proxy calls resulting from execution of code by a container. In one embodiment, the proxying is performed by proxies that may comprise hardware (e.g., circuitry, dedicated logic, etc.), software (e.g., software running on a chip, software run on a general-purpose computer system or a dedicated machine, etc.), firmware, or a combination of the three.

Referring to FIG. 4, the code is being executed in container 305 in container host 303. As a result of execution, network calls to access sites at remote locations 410 (e.g., the internet, local area network devices, etc.) are made through an egress proxy (e.g., a man-in-the-middle proxy 401). In one embodiment, the man-in-the-middle proxy is a man in the middle Transport Layer Security (TLS) proxy. That is, as the code is executed in shellbox 304 running inside container 305, the TLS proxy performs a man-in-the-middle operation on all TLS connections from pry.

Proxies are also used when accessing other resources such as, for example and not limited to, company internal databases and data collections having sensitive data. In this case, calls to access these databases are routed through an identification module 402 that identifies the proxy associated with the call and forwards the call to the proper proxy. In one embodiment, proxy identification module 402 also tags the request with the user identification information (e.g., computer identification information) to the header of the call (e.g., request) to identify the person executing the code (or their computer system) that generated the call during execution to the proxy. In one embodiment, this user is the user of computer system 301 of FIG. 3. In one embodiment, the tagging is made via a HTTP header of the request. In one embodiment, this user identification information enables the proxy to determine if the person executing the code has permission to access the database or data collection that is to be accessed by the call. In one embodiment, a proxy tags the request as coming from a particular external user and then passes that information to an internal service that performs logging with the tag.

In the example arrangement given in FIG. 4, proxy identification module 402 forwards the call to one of three proxies: $proxy_1$, $proxy_2$ or $proxy_3$, that are part of proxies 412. For example, proxy identification module 402 forwards the call to $proxy_1$ when the call is to access database 431. Similarly, proxy identification module 402 forwards the call to $proxy_2$ if the call is to access database 432. Lastly, proxy identification module 402 forwards the call to $proxy_3$ if the call was to access a search capability internal to the company as part of search 433. Thus, by using proxies and proxying calls made as a result of execution of the code in container, access control may be achieved.

In one embodiment, when code execution in the container causes a file to be moved from one location to another on a remote server, one or more of proxies 412 are configured to prevent the data in the file form being copied into the container and also prevents the data in the file becoming part of the audit log. This provides an additional level of security, particularly when the file includes sensitive data, in that the contents of the data file cannot be viewed by individuals. In one embodiment, this is accomplished by having the proxy itself is responsible for moving the file, rather than a program running inside the container.

In one embodiment, one or more of the proxies are configured to replace credentials from a call or request to ensure that the user has some, but limited, access to a resource. For example, in one embodiment, execution of the code results in a request that contains dummy credentials provided by Amazon Web Services (AWS) (or another remote computing service) for access to cloud computing infrastructure. When received by the proxy, the proxy makes a separate request to AWS to get instance credentials for the particular user assigned to the container that are scoped to the particular IP address that are restricted in time (e.g., under 15 minutes). Upon receiving such instance credentials from AWS, the proxy writes the request by replacing the original dummy credentials with the new instance credentials for the particular user assigned to the container. Then the proxy forwards the request to AWS.

Note that although only one container is shown, there may be multiple containers with multiple sessions open at one time. In this case, the proxies support multiple containers and are able to perform access control for all the containers. This may involve the proxies determining that each of the containers have different access permissions and granting/denying access based on those different access permissions.

Proxies 412 and proxy 401 also send information related to the network communications to log aggregator 411, which logs all the information to create trusted logs. In one embodiment, log aggregator 411 produces trustworthy audit logs of every command run in a production pry session in container 306.

An Example Computer System

Figure 5:
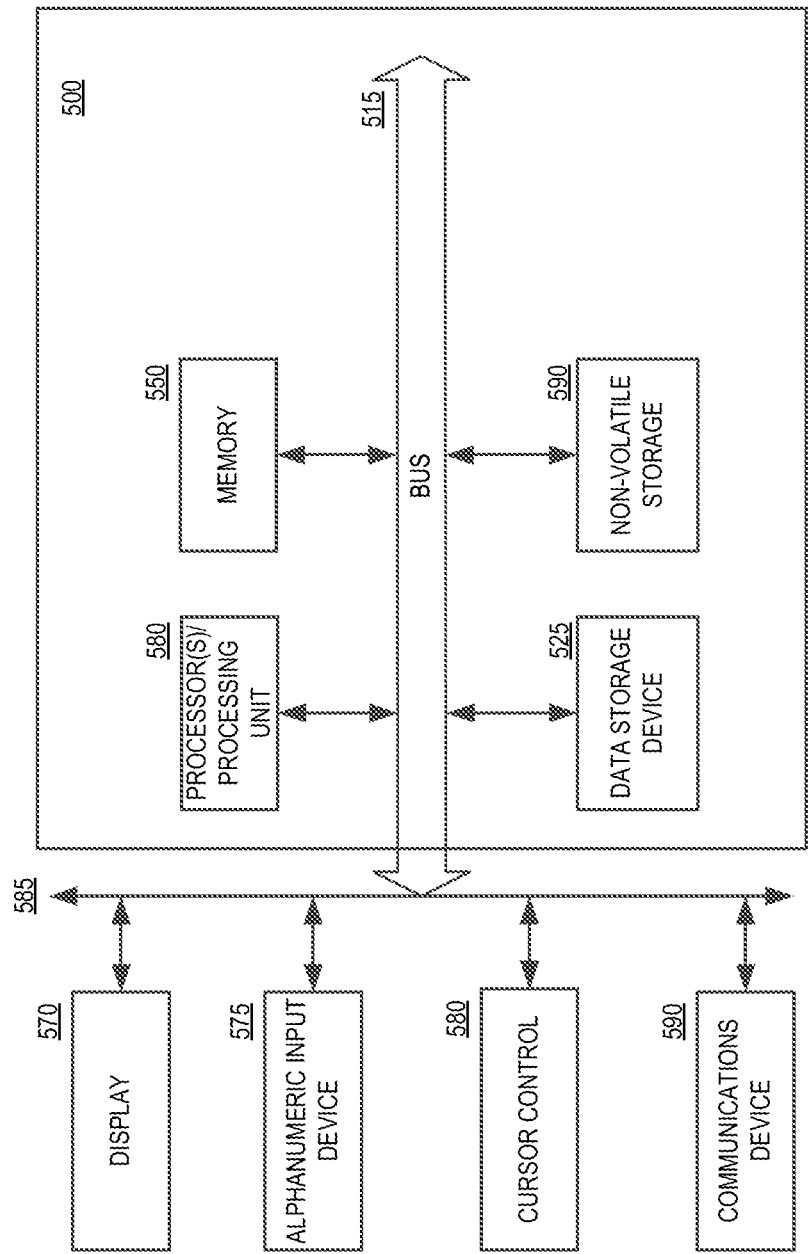
FIG. 5 is a block diagram of one embodiment of a computer system.

FIG. 5 is one embodiment of a computer system that may be used to support the systems and operations discussed herein. It will be apparent to those of ordinary skill in the art, however, that other alternative systems of various system architectures may also be used.

The data processing system illustrated in FIG. 5 includes a bus or other internal communication means 515 for communicating information, and a processor(s) 510 coupled to the bus 515 for processing information. The system further comprises a random-access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

In one embodiment, processor(s) 510 executes instructions to perform any of the operations described above including execution of one or more containers, their associated production shell (e.g., pry) session, the one or more proxies and the log aggregator.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 585, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need to be present for the device to function.

There are a number of example embodiments described herein.

Example 1 is a method comprising: generating code on a host computer system using a user interface; and executing the code inside a container on the host computer system, including performing access control based on one or more properties of the host computer system.

Example 2 is the method of example 1 that may optionally include that access control is enforced on a per user basis.

Example 3 is the method of example 1 that may optionally include that performing access control comprises proxying all calls from inside the container through a trusted environment that performs access control.

Example 4 is the method of example 3 that may optionally include that the trusted environment performs logging of actions performed by executing the code.

Example 5 is the method of example 1 that may optionally include that the one or more properties comprises information indicative of a user assigned to the container, and access control is based on whether the user assigned to the container has permission for an access performed by execution of the code.

Example 6 is the method of example 1 that may optionally include running one or more proxies; and sending network communications associated with execution of the code into and out of the container through the one or more proxies.

Example 7 is the method of example 6 that may optionally include that the one or more proxies are configured to perform the access control.

Example 8 is the method of example 6 that may optionally include generating, by the one or more proxies, audit logs for the network communications.

Example 9 is the method of example 1 that may optionally include replacing, by one of the one or more proxies, an instance credential in a network request originating inside the container from executing the code with a user specific credential.

Example 10 is the method of example 1 that may optionally include that the one or more proxies are running on the host.

Example 11 is the method of example 1 that may optionally include, prior to execution, approving the code for execution using a multi-party approval process, including: capturing the code on the host computer system; sending captured code for review to a second system remotely located with respect to the host computer system; and receiving an indication of approval or disapproval from the second system, the code subsequently executing inside the container in response to receiving the approval.

Example 12 is the method of example 11 that may optionally include that the multi-party approval process is operable to approve access collections designated to contain sensitive data.

Example 13 is the method of example 1 that may optionally include that commands of the code are executed in a production session.

Example 14 is the method of example 13 that may optionally include that the production session is an interactive shell.

Example 15 is a system comprising: a display; a network interface; a memory to store instructions; and one or more processors coupled to the memory, the display, and the network interface to execute the stored instructions to: receive code enter via a user interface; and execute the code inside a container, the one or more processors to perform access control based on one or more properties of the system.

Example 16 is the system of example 15 that may optionally include that access control is enforced on a per user basis.

Example 17 is the system of example 15 that may optionally include that the one or more processors are configured to perform access control by proxying all calls from inside the container through a trusted environment on the system that performs access control.

Example 18 is the system of example 17 that may optionally include that the trusted environment performs logging of actions performed by executing the code Example 19 is the system of example 15 that may optionally include that the one or more properties comprises information indicative of a user assigned to the container, and access control is based on whether the user assigned to the container has permission for an access performed by execution of the code.

Example 20 is the system of example 15 that may optionally include that the one or more processors are operable to: run one or more proxies; and send network communications associated with execution of the code into and out of the container through the one or more proxies.

Example 21 is the system of example 20 that may optionally include that the one or more proxies are configured to perform the access control.

Example 22 is the system of example 21 that may optionally include that the one or more proxies create audit logs for the network communications.

Example 23 is the system of example 21 that may optionally include that the one or more proxies are operable to replace an instance credential in a network request originating inside the container from executing the code with a user specific credential.

Example 24 is the system of example 15 that may optionally include that commands of the code are executed in a production session.

Example 25 is one or more non-transitory computer readable storage media having instructions stored thereupon which, when executed by a system having at least a processor and a memory therein, cause the system to perform operations comprising: generating code on a host computer system using a user interface; and executing the code inside a container on the host computer system, including performing access control based on one or more properties of the host computer system.

Example 26 is the system of example 25 that may optionally include that access control is enforced on a per user basis.

Example 27 is the system of example 25 that may optionally include that performing access control comprises proxying all calls from inside the container through a trusted environment that performs access control.

Example 28 is the system of example 27 that may optionally include that the trusted environment performs logging of actions performed by executing the code.

Example 29 is the system of example 25 that may optionally include that the method further comprises, prior to execution, approving the code for execution using a multi-party approval process, by: capturing the code on the host computer system; sending captured code for review to a second system remotely located with respect to the host computer system; and receiving an indication of approval or disapproval from the second system, the code subsequently executing inside the container in response to receiving the approval.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    generating code on a host computer system;
    receiving, at the host computer system from a first user device, a first approval of the code from a first user, the first user device being associated with a first access credential to a destination system;
    receiving, at the host computer system from a second user device, a second approval of the code from a second user, the second user device being associated with second access credentials to the destination system;
    in response to receiving the first approval and the second approval, generating an approval of the code, enabling execution of the code inside a container;
    after receiving both the first approval and the second approval, executing, on the host computer system, the code inside the container, wherein the execution of the code is initiated by a third user;
    intercepting, by a proxy identification system, a network communication generated by the code for accessing a resource outside of the host computer system to enforce security and access control for the code executed inside the container to access the resource outside of the host computer system;
    selecting, by the proxy identification system, a proxy from a set of proxies based on an identification of the destination system having the resource; and
    after determining, by the selected proxy, that the third user has permission to access the resource at the destination system, sending the network communication associated with execution of the code to the destination system through the selected proxy.

2. The method of claim 1, further comprising:
    transmitting, by the proxy to an audit log aggregator, information related to the network communication; and
    generating, by the audit log aggregator, an audit log entry in an audit log for the execution of the code based at least in part on the information, wherein the audit log entry in the audit log is mapped to the first user and the code based on the information, wherein the audit log entry includes a record of actions performed by the code and commands entered by the first user, and wherein the audit log is inaccessible from inside the container.

3. The method of claim 2, further comprising:
    receiving, by the audit log aggregator from a plurality of proxies of the set of proxies, a plurality of information associated with a plurality of network communications sent out of and into the container as a result of execution of the code; and
    aggregating, by the audit log aggregator for each network communication of the plurality of network communications generated a result of execution of the code, the plurality of information into a plurality of corresponding audit log entries in the audit log.

4. The method of claim 2, further comprising:
    storing, in the audit log, first records of actions performed by the code, second records of commands entered by the user, and third records of all network traffic into and out of the container.

5. The method of claim 4, wherein further in response to receiving the first approval and the second approval, the container is associated with both the first user and the second user, and wherein the executing the code causes a file to be moved from one location on a remote server to another location on the remote server, wherein the selected proxy is configured to prevent at least a portion of data in the file from being copied into the container and from being recorded as part of the audit log.

6. The method of claim 1, wherein each audit log entry is further mapped to the second user.

7. The method of claim 1, wherein the second user has a greater level of access credentials than the first user.

8. The method of claim 1, wherein the set of proxies comprises at least one proxy to at least one internal destination system accessible via an internal network of an organization associated with the host computer system, and the set of proxies further comprises an egress proxy to a remote destination system accessible via a public network.

9. The method of claim 8, wherein the egress proxy comprises a transport layer security proxy.

10. The method of claim 1, wherein the code is executed in a trusted production environment inside the container.

11. The method of claim 1, wherein the intercepted network communication comprises a placeholder credential for accessing the destination system, and prior to sending the network communication the method further comprises:
    obtaining, by the proxy from the destination system, instance credentials for the first user that is executing the code inside the container; and
    replacing, by the proxy, the placeholder credential with the instance credentials in the network communication.

12. The method of claim 11, wherein the instance credentials are scoped to one or more of an internet protocol address or a duration of time.

13. The method of claim 1, wherein commands of the code are executed in a production session, and wherein the production session is an interactive shell.

14. The method of claim 1, further comprising:
    deriving, by the selected proxy from the network communication, identification information for the container that originated the network communication; and determining, by the selected proxy and based on the identification information for the container that originated the network communication, the third user associated with the container.

15. A non-transitory computer readable storage medium including instructions that, when executed by a computer processing system, cause the computer processing system to perform operations, comprising:
   generating code on a host computer system;
   receiving, at the host computer system from a first user device, a first approval of the code from a first user, the first user device being associated with a first access credential to a destination system;
   receiving, at the host computer system from a second user device, a second approval of the code from a second user, the second user device being associated with second access credentials to the destination system;
   in response to receiving the first approval and the second approval, generating an approval of the code, enabling execution of the code inside a container;
   after receiving both the first approval and the second approval, executing, on the host computer system, the code inside the container, wherein the execution of the code is initiated by a third user;
   intercepting, by a proxy identification system, a network communication generated by the code for accessing a resource outside of the host computer system to enforce security and access control for the code executed inside the container to access the resource outside of the host computer system;
   selecting, by the proxy identification system, a proxy from a set of proxies based on an identification of the destination system having the resource; and
   after determining, by the selected proxy, that the third user has permission to access the resource at the destination system, sending the network communication associated with execution of the code to the destination system through the selected proxy.

16. The non-transitory computer readable storage medium of claim 15, the operations further comprising:
   transmitting, by the proxy to an audit log aggregator, information related to the network communication; and
   generating, by the audit log aggregator, an audit log entry in an audit log for the execution of the code based at least in part on the information, wherein the audit log entry in the audit log is mapped to the first user and the code based on the information, wherein the audit log entry includes a record of actions performed by the code and commands entered by the first user, and wherein the audit log is inaccessible from inside the container.

17. The non-transitory computer readable storage medium of claim 16, the operations further comprising:
   receiving, by the audit log aggregator from a plurality of proxies of the set of proxies, a plurality of information associated with a plurality of network communications sent out of and into the container as a result of execution of the code; and
   aggregating, by the audit log aggregator for each network communication of the plurality of network communications generated a result of execution of the code, the plurality of information into a plurality of corresponding audit log entries in the audit log.

18. The non-transitory computer readable storage medium of claim 15, wherein the set of proxies comprises at least one proxy to at least one internal destination system accessible via an internal network of an organization associated with the host computer system, and the set of proxies further comprises an egress proxy to a remote destination system accessible via a public network.

19. The non-transitory computer readable storage medium of claim 15, wherein the intercepted network communication comprises a placeholder credential for accessing the destination system, and prior to sending the network communication the operations further comprise:
   obtaining, by the proxy from the destination system, instance credentials for the first user that is executing the code inside the container; and
   replacing, by the proxy, the placeholder credential with the instance credentials in the network communication.

20. A system, comprising:
   a memory storing at least one instruction; and
   a processing system, coupled with the memory, configured to execute the at least one instruction causing the processing system to perform operations, comprising:
      generating code on a host computer system,
      receiving, at the host computer system from a first user device, a first approval of the code from a first user, the first user device being associated with a first access credential to a destination system,
      receiving, at the host computer system from a second user device, a second approval of the code from a second user, the second user device being associated with second access credentials to the destination system,
      in response to receiving the first approval and the second approval, generating an approval of the code, enabling execution of the code inside a container,
      after receiving both the first approval and the second approval, executing, on the host computer system, the code inside the container, wherein the execution of the code is initiated by a third user,
      intercepting, by a proxy identification system, a network communication generated by the code for accessing a resource outside of the host computer system to enforce security and access control for the code executed inside the container to access the resource outside of the host computer system,
      selecting, by the proxy identification system, a proxy from a set of proxies based on an identification of the destination system having the resource, and
      after determining, by the selected proxy, that the third user has permission to access the resource at the destination system, sending the network communication associated with execution of the code to the destination system through the selected proxy.

* * * * *